June 28, 1927.
M. E. MOELLER
1,633,599
THERMOMETER
Filed July 18, 1919
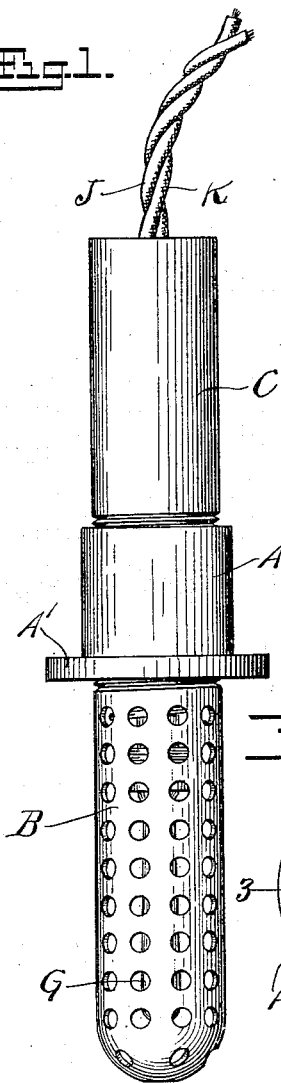
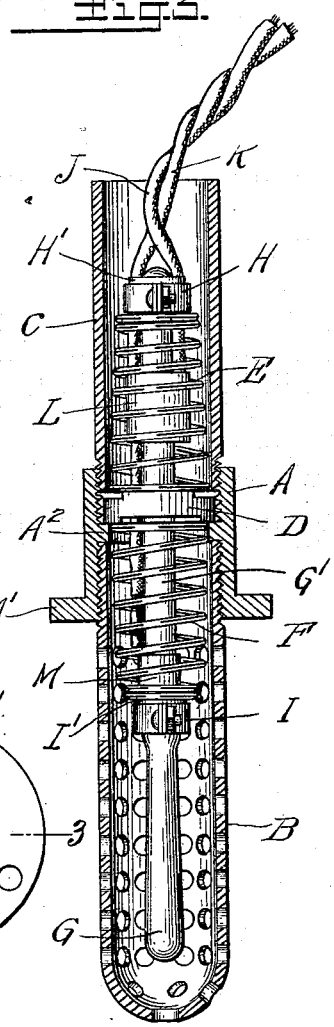
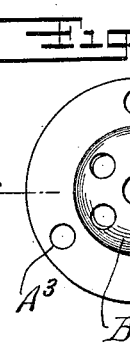
INVENTOR
Max E. Moeller
BY
ATTORNEY Patented June 28, 1927.

1,633,599

UNITED STATES PATENT OFFICE.

MAX E. MOELLER, OF BROOKLYN, NEW YORK.

THERMOMETER.

Application filed July 18, 1919. Serial No. 311,833.

The improvements relate to thermometers and are designed more particularly to be used in connection with the thermometers of a thermostat. Devices of this kind are commonly used to operate mechanism or sound an alarm or operate other mechanism when the temperature of the surrounding atmosphere or fluid reaches a certain point, and are employed for many purposes. It has been found, however, that when used on moving objects, such as vessels, or in any other environment where a thermometer is subjected to sudden shocks or vibration, the mercury or other expansible fluid in the thermometer will become disturbed and will sometimes cause the thermostatic apparatus to operate prematurely or render the instrument inoperative. This fault will be understood when it is considered that the liquid in the thermometer is very fluent and is located in the lower part of a tube, from which the air has been exhausted. A sudden shock or unusual vibration will cause the liquid in the tube to separate and a portion of it to rise therein, and perhaps close the electrical circuit, causing a false alarm or an accidental operation of the apparatus controlled by the thermostat. When it is considered that in some vessels each compartment is provided with a thermostat device, and that if one of them is caused to operate accidentally the entire vessel, with perhaps thousands of persons aboard, is given an alarm, it will be seen that the objection here noted is a serious one. In other uses the objection is also serious to a greater or lesser degree. Various means have been devised for preventing this accidental operation of the thermostat thermometer, but so far as can be ascertained without success.

Among the objects of the present improvements is the provision of a thermostat thermometer, with means for absorbing shocks and vibrations, and preventing them from affecting the fluid therein, thus rendering them safe, dependable and desirable for use under all conditions and in various surroundings, as, for instance, on ships, trains, automobiles, air ships, and other means of transportation. They are illustrated in the accompanying drawings referred to herein, and forming a part thereof.

In the said drawings, Figure 1 is an elevation of a thermostat device embodying the improvements; Figure 2 is a bottom plan of the same, and Figure 3 is a vertical section on the line 3—3 of Figure 2 of the outer casing, showing the parts enclosed therein in elevation.

The casing of the thermometer is composed of three parts, viz: the collar A, with external annular bottom flange A' and similar medial internal flange $A^2$, the foraminous metal envelope B and the tube C. The parts B and C are externally threaded, and the collar A internally threaded, so that all of the said parts are removably secured together by securing the said parts into the said collar, the part B impinging against the internal flange $A^2$ when in its innermost position.

A ring D is adapted to fit inside the collar A and to rest against the flange $A^2$, and to this ring are secured spiral springs E and F, one extending upwardly and the other downwardly therefrom. The ring is secured in position in the collar A by being clamped between the end of the tube C and the annular flange $A^2$, and the springs E and F are secured to the ring slightly inside its periphery, so that they will clear the casing and the said flange.

The thermometer consists of a bulb portion G and stem G', and is provided at the top and bottom of its stem with collars H and I clamped thereon, but insulated therefrom by sleeves of soft rubber or other suitable elastic non-conductor H' and I'. To the collar H the outer end of the spiral spring E is secured—by soldering or other suitable means—and to the collar I the outer end of the spring F is similarly secured. The opposite ends of the springs may be secured to the ring D in the same manner. The springs may be made of brass or other resilient material, and are preferably so formed that the coils decrease in diameter from the ring D to the collars, thus preventing the said collars or the bulb of the thermometer from coming in contact with the walls of the casing, and at the same time cushioning the thermometer against shocks in all directions, and permitting it to vibrate laterally as well as vertically.

In operation when the thermostat device is subjected to a shock this shock is communicated to the thermometer, and can only be communicated thereto through the springs E and F, which absorb the force of the shock and prevent sudden jarring of the expansible fluid.

The thermometer is provided with the usual insulated open circuit wires J and K, leading to an alarm or other electrically operated device for indicating the rise in temperature, the wire J being secured to the upper part of the stem and communicating with the bore of the same, and the wire K communicating with the bulb, so that when the fluid rises to the level of the terminal of the wire J the circuit is closed. An insulating sleeve L surrounds the terminal of the wire K, and protects it from contact with the spring E or the casing, and a similar sleeve M surrounds the terminal of the wire K.

It will be apparent that various changes in details of construction may be made without departing from the spirit and scope of the invention. Thus the character of the spring shock-absorbing medium may vary, and the connection between it and the thermometer casing on the one hand and the thermometer on the other may be changed. The external annular flange A' is provided with screw holes A³ by means of which it may be secured to any flat surface if desired, so that the envelope B will project beyond. Various other additions and modifications may be made if desired.

What I claim is:

1. A device of the character described, comprising a hollow casing, a thermometer mounted within said casing, and a resilient connection between said casing and the sides of said thermometer and surrounding the latter, said connection being secured to the casing at one point and secured to the thermometer at a point distant therefrom, and being of slightly less diameter than the internal diameter of the casing at the point of its connection with the said thermometer.

2. The combination of a hollow rigid casing, composed of detachable sections, a thermometer or the like mounted within said casing and out of contact therewith, a spring, a rigid member to which one end of said spring is secured, said member being attached to the casing at the junction of two of its sections, and said spring extending away from the rigid member and being out of contact with the casing and secured at the other end to the thermometer.

3. The combination of a casing, springs mounted therein and extending longitudinally thereof, a thermometer secured to said springs at points near the extremities thereof and a connection between said springs and the casing, said springs being out of contact with the casing between the points of their attachment thereto and the points of their connection with the thermometer.

Witness my hand this 12th day of July, 1919, at the city of New York, in the county and State of New York.

MAX E. MOELLER.